United States Patent
Dailey

(10) Patent No.: US 6,577,874 B1
(45) Date of Patent: Jun. 10, 2003

(54) METHODS AND SYSTEMS FOR PROVIDING TEMPORARY IDENTIFICATION NUMBERS FOR MOBILE TERMINALS

(75) Inventor: Timothy E. Dailey, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/309,018

(22) Filed: May 10, 1999

(51) Int. Cl.[7] .................................................. H04B 7/00
(52) U.S. Cl. ......................... 455/521; 455/404; 455/435
(58) Field of Search ................................ 455/404, 432, 455/435, 458, 461, 515, 518, 519, 521, 520, 524, 525; 370/432, 312, 338, 475, 327

(56) References Cited

U.S. PATENT DOCUMENTS

| | | | |
|---|---|---|---|
| 4,646,345 A | * 2/1987 | Zdunek et al. | 455/509 |
| 5,150,361 A | 9/1992 | Wieczorek et al. | 370/95.1 |
| 5,168,575 A | 12/1992 | Cizek et al. | |
| 5,274,837 A | 12/1993 | Childress et al. | 455/7 |
| 5,299,199 A | 3/1994 | Wilson et al. | 370/95.3 |
| 5,345,474 A | 9/1994 | Hoshikawa | 375/7 |
| 5,465,391 A | 11/1995 | Toyryla | |
| 5,475,689 A | * 12/1995 | Kay et al. | 370/95.3 |
| 5,506,837 A | 4/1996 | Sollner et al. | 370/31 |
| 5,594,948 A | 1/1997 | Talarmo et al. | |
| 5,613,201 A | * 3/1997 | Alford et al. | 455/331 |
| 5,617,412 A | 4/1997 | Delprat et al. | 370/281 |
| 5,629,940 A | 5/1997 | Gaskill | 3710/311 |
| 5,697,058 A | 12/1997 | Paavonen | |
| 5,774,806 A | * 6/1998 | Tayloe et al. | 455/427 |
| 5,797,100 A | 8/1998 | Dettner | |
| 5,822,694 A | 10/1998 | Coombes et al. | 455/433 |
| 5,857,144 A | 1/1999 | Mangum et al. | 455/11.1 |

(List continued on next page.)

FOREIGN PATENT DOCUMENTS

| | | | |
|---|---|---|---|
| EP | 0 642 287 A1 | 9/1993 | ............ H04Q/7/38 |
| EP | 0 942 616 A1 | 9/1999 | ............ H04Q/7/38 |
| GB | 2 271 690 | 4/1994 | ............ H04Q/7/04 |
| WO | WO 94/14289 | 6/1994 | ............ H04Q/7/04 |
| WO | WO 94/28687 | 12/1994 | ............ H04Q/7/04 |
| WO | WO 97/07604 | 2/1997 | ............ H04B/7/26 |
| WO | WO98/05157 A2 | 2/1998 | |
| WO | WO98/05157 A3 | 2/1998 | ............ H04N/9/00 |
| WO | WO98/05176 | 2/1998 | ............ H04Q/7/22 |
| WO | WO 98/05176 | * 5/1998 | ............ H04Q/7/38 |
| WO | WO 99/17581 | 8/1999 | ............ H04Q/7/38 |

OTHER PUBLICATIONS

*TR45 TIA/EIA–136–123–A Draft Text: Digital Control Channel Layer 3*; Ch.1.1.1 and 1.1.2, 5 pages (Aug. 1998).
Copy of International Search Report of PCT/US00/09549.

*Primary Examiner*—Edward F. Urban
*Assistant Examiner*—Tilahun Gesesse
(74) *Attorney, Agent, or Firm*—Myers Bigel Sibley & Sajovec

(57) ABSTRACT

A method of receiving digital messages from a mobile terminal at a radio base station of a communications system including a plurality of radio base stations is discussed. This method includes receiving a login message at the radio base station from the mobile terminal wherein the login message includes a caller address number for the mobile terminal and wherein the caller address number comprises a first number of bits. After receiving the login message, a temporary identification number is selected at the base station for the mobile terminal wherein the temporary identification number comprises a second number of bits less than the first number of bits. The temporary identification number is transmitted from the radio base station to the mobile terminal, and after transmitting the temporary identification number, a digital information message is received at the radio base station from the mobile terminal wherein the digital information message includes the temporary identification number and payload information. Related systems, base stations, and mobile terminals are discussed.

38 Claims, 10 Drawing Sheets

U.S. PATENT DOCUMENTS

| | | |
|---|---|---|
| 5,873,023 A | 2/1999 | Phillips et al. |
| 5,930,723 A | 7/1999 | Heiskari et al. |
| 5,970,417 A | 10/1999 | Toyryla et al. |
| 5,987,331 A * | 11/1999 | Grube et al. ............... 455/509 |
| 5,991,635 A * | 11/1999 | Dent et al. .................. 455/517 |
| 6,026,296 A * | 2/2000 | Sanders, III et al. ....... 455/426 |
| 6,111,867 A | 8/2000 | Mann et al. ................ 370/337 |
| 6,115,613 A | 9/2000 | Jonsson |
| 6,138,011 A | 10/2000 | Sanders, III et al. |
| 6,157,829 A * | 12/2000 | Grube et al. ................ 455/414 |
| 6,195,415 B1 * | 2/2001 | Shimoda et al. .............. 379/22 |
| 6,272,334 B1 * | 8/2001 | Rao ........................... 455/418 |
| 6,292,670 B1 | 9/2001 | Kauria et al. |
| 6,377,560 B1 | 4/2002 | Dailey ........................ 370/329 |

* cited by examiner

| INFORMATION | TYPE | LENGTH (BITS) |
|---|---|---|
| PROTOCOL DISCRIMINATOR | M | 2 |
| MESSAGE TYPE IDENTIFIER | M | 8 |
| FIRST INFORMATION ELEMENT | M | n |
| SECOND INFORMATION ELEMENT | M | n |

FIG. 10.

| INFORMATION | TYPE | LENGTH (BITS) |
|---|---|---|
| PROTOCOL DISCRIMINATOR | M | 2 |
| MESSAGE TYPE - BSMC | M | 8 |
| BASE STATION MANUFACTURER CODE | M | 8 |
| BSMC SPECIFIC MESSAGE TYPE | M | MIN.3 |
| FIRST INFORMATION ELEMENT | M | n |
| SECOND INFORMATION ELEMENT | M | n |

FIG. 11.

| INFORMATION | TYPE | LENGTH (BITS) |
|---|---|---|
| PROTOCOL DISCRIMINATOR | M | 2 |
| MESSAGE TYPE - BSMC | M | 8 |
| BASE STATION MANUFACTURER CODE | M | 8 |
| BSNC SPECIFIC MESSAGE TYPE | M | MIN.3 |
| TLID ENABLED | M | 1 |
| FIRST INFORMATION ELEMENT | M | n |
| SECOND INFORMATION ELEMENT | M | n |

FIG. 12.

METHODS AND SYSTEMS FOR PROVIDING TEMPORARY IDENTIFICATION NUMBERS FOR MOBILE TERMINALS

RELATED APPLICATIONS

This application is related to: application Ser. No. 09/309,005 entitled Methods and Systems for Providing Group Calls with Reduced Setup Times; application Ser. No. 09/309,012 entitled Apparatus And Methods For Conducting Group Calls In Wireless Communications Systems; application Ser. No. 09/307,996 entitled Methods, System, And Terminals For Assigning Control Channel Time Slots For Group And Individual Pages; and application Ser. No. 09/309,022 entitled Methods, Systems, And Terminals For Providing Group Communications Over A Common Traffic Channel. Each of these applications are being filed concurrently with the present application, each of these applications have common inventorship, and each of these applications are assigned to Ericsson, Inc. In addition, the disclosures of each of these applications are hereby incorporated herein by reference.

FIELD OF THE INVENTION

The present invention relates to the field of communications and more particularly to radiotelephone communications methods and systems.

BACKGROUND OF THE INVENTION

Conventional cellular communications systems (such as systems operating according to the IS-136 standard) generally provide one-to-one communications from one mobile terminal to another mobile terminal or to a landline telephone coupled to a public switched telephone network. A conventional cellular communications system is illustrated in FIG. 1. This system includes a mobile switching center (MSC) 31 and a home location register 33.

The MSC is coupled to a plurality of radio base stations (RBS) 32 wherein each RBS 32 defines a cell 35. In addition, the MSC can be coupled to a public switched telephone network (PSTN) 36. As will be understood by those having skill in the art, the conventional cellular communications system of FIG. 1 can provide cellular radiotelephone communications for one or more cellular mobile terminals (MT) 37. More particularly, the cellular radiotelephone communications can be provided using conventional cellular standards wherein a telephone is dialed to place a call to another communications device.

Each radio base station provides radio frequency transmit and receive functions and supports low level protocol functions. Moreover, a radio base station can be considered a dumb peripheral of the MSC 31 wherein the MSC provides central intelligence for the system. Each radio base station can be coupled to the MSC 31 via communications links 39. These communications links can be T1 links provided, for example, via landline or microwave. The MSC 31 provides voice path switching between two cells or a cell and the PSTN 36. The MSC 31 provides central system intelligence to control the radio base stations and to process high level protocol messages from mobile terminals 37 relayed by the radio base stations. In other words, the MSC handles call setup, paging, handoff, and call connection.

The home location register 33 keeps track of the current status of the mobile terminals. For each mobile terminal, for example, the home location register can record whether that terminal is on, off, or busy, as well as the location area (including a group of cells) within which the mobile terminal is located. The home location register can also include a database of restrictions and allowed service features for each mobile terminal. The home location register can also be considered a portion of the MSC.

The setup of a call between mobile terminals 37 using the system of FIG. 1 is illustrated in FIG. 2. As shown, the originating mobile terminal 37a issues an origination message which is received by the radio base station 32a for the cell 35a in which the mobile terminal 37a is located. According to the IS-136 standard, a conventional origination message may be sent over time slots in a plurality of time division multiple access (TDMA) time frames. The radio base station 32a checks the origination message for errors, and if no significant errors are detected, the radio base station 32a forwards the message to the mobile switching center. The mobile switching center authenticates the originating mobile terminal 37a and analyses the called number. If the originating mobile terminal and the called number are valid, the mobile switching center instructs the radio base station 32a to assign a Digital Traffic Channel (DTC) to the originating mobile terminal. Origination and channel designation messages are discussed, for example, in TR45, TIA/EIA-136-123-A Draft Text, Digital Control Channel. Layer 3, Aug. 31, 1998, the disclosure of which is hereby incorporated herein in its entirety by reference.

Because the called party is another mobile terminal, the mobile switching center checks the HLR to determine the current location area (LA) for the called mobile terminal 37b if the called mobile terminal is active. A plurality of cells is assigned to a location area, and a mobile terminal updates its location with the cellular system only when the mobile terminal enters a new location area. Accordingly, location area updates are not needed every time a mobile terminal enters a new cell. While Digital Control Channel (DCCH) traffic may be reduced, pages for a called mobile terminal may need to be transmitted in all cells assigned to the location area.

The mobile switching center then issues a page message to all radio base stations supporting cells in the location area of the called mobile terminal 37b. Each of these radio base stations issues a page message on an appropriate paging subchannel. Because of the DCCH paging structure, however, a period of time as long as 1.28 seconds may pass before the page message can be issued. The page message wakes the called mobile terminal from its battery sleep mode, and the called mobile terminal 37b responds to the appropriate radio base station (now referred to as the called radio base station 32b) with a page response message to indicate the same.

The page response message is relayed from the called radio base station 32b to the mobile switching center, and the mobile switching center instructs the called radio base station 32b to assign a digital traffic channel to the called mobile terminal 37b. The mobile switching center then completes a communications path between the originating mobile terminal 37a and the called mobile terminal 37b using the two digital traffic channels.

The conventional cellular communications system of FIG. 1, however, may not support dispatch oriented group calls (also referred to as conference calls). Radio dispatch group communications systems are commonly used by emergency service providers such as police and/or fire departments to provide communications between a dispatcher and emergency personnel. For example, a police dispatcher can simultaneously call all on-duty police officers using a radio dispatch communications system. Alternately, a police office can quickly establish communications with other police officers and/or dispatchers simply by pressing a push-to-talk button on his radio. Similar radio dispatch communications systems may also be used by businesses such as trucking and/or taxi businesses.

In general, radio dispatch group communications systems provide one-to-many group communications as opposed to one-to-one communications provided by conventional cellular radiotelephone communications systems. Radio dispatch group communications are also preferably provided without the call setup delays that may be common in a conventional cellular radiotelephone communications system. For example, the time required to setup a call in a conventional IS-136 cellular radiotelephone system may be as long as 6 or 7 seconds including up to 1.28 seconds just to page the receiving cellular radiotelephone. This setup time, however, may be unacceptable for police and other radio dispatch group communications systems.

With the proliferation of cellular communications systems, there has been an effort to provide hybrid communications systems that can support both cellular radiotelephone communications as well as dispatch oriented group communications. Such a system has been developed, for example, by Motorola with service being offered by Nextel. A similar system has been developed by Ericsson (the assignee of the present application) under the name DAMPS-PRO. In particular, the DAMPS-PRO product provides cellular communications according to the IS-136 cellular communications standard, as well as dispatch oriented group communications for predefined user groups.

In the DAMPS-PRO system, intelligent group communications functionality is added to an IS-136 cellular communications system as shown in FIG. 3. This intelligent group communications functionality is provided by adding a group server 41, a group bridge 43, a local area network 45, and a group database 47. The cells, mobile switching center, home location register, public switched telephone network, and radio base stations provide cellular communications as discussed above with regard to FIGS. 1 and 2.

With regard to group calls, the group bridge provides a bank of telephony equipment which can initiate and receive radiotelephone calls, provide voice prompts, and respond to user inputs. The bridge also provides a group function that sums the audio from all parties within a designated group and distributes the summed audio to all parties. The server communicates with the mobile switching center via standard telephony signaling (such as defined by the SS7 standard) and controls the operation of the bridge equipment via the local area network.

The setup for a group call according to the DAMPS-PRO system is illustrated in FIG. 4. In general, a predetermined set of mobile terminals define a group which can communicate in the group call mode. Each of these mobile terminals may have standard cellular radiotelephone functionality whereby one-to-one communications can be provided after entering a telephone number and pressing a send button. Mobile terminals in a conference group may also include a push-to-talk (PTT) button which can automatically establish a group call with other active mobile terminals in the group.

In particular, an originating mobile terminal 37$a'$ may issue an origination message when the PTT button is pushed. The radio base station providing service to the originating mobile terminal 37$a'$ (now referred to as the originating radio base station 32$a'$) receives the origination message, and checks the origination message for errors. If no significant errors are detected, the origination message is forwarded to the mobile switching center. The mobile switching center authenticates the originating mobile terminal 37$a'$ and analyses the called number therein identifying the group. If the originating mobile terminal 37$a'$ and the identified group are valid, the mobile switching center authorizes the originating radio base station 32$a'$ to assign a digital traffic channel to the originating mobile terminal 37$a'$, and a conversation channel is established between the originating mobile terminal 37$a'$ and the group bridge 43 using the assigned digital traffic channel.

Group calls are indicated by a called party number portion of the origination message that is understood by both the mobile terminals in the group and the mobile switching center. The mobile switching center detects that the called party number is for a group call and connects the originating mobile terminal to the conference bridge. The conference server accepts the call and then searches the group database to determine the other mobile terminals in the group that should be called. The server then instructs the conference bridge to place calls to each of the other mobile terminals in the group via the mobile switching center. The call from the originating mobile terminal and the calls to each of the other mobile terminals in the group are then grouped together. In particular, the mobile switching center issues pages for each of the other mobile terminals in the group and completes each call normally once each serving radio base station is known. As further shown in the flow diagram of FIG. 5, the steps of sending the origination message at block 81, setting up the originating side of the call at block 83, paging to locate the called mobile terminals at block 85, and setting up the terminating side of the call at block 87 proceed sequentially.

As discussed above, however, an origination message according to the IS-136 standard may be transmitted over time slots in multiple time division multiple access (TDMA) time frames thereby increasing the time needed to set up a group call. The transmission of an origination message over multiple time frames may also reduce the probability that a complete origination message is correctly received by the communications system on the first transmission thereof. Accordingly, there continues to exist a need in the art for improved methods and systems for generating group call origination and other messages.

SUMMARY OF THE INVENTION

It is therefore an object of the present invention to provide improved methods and systems providing group call origination and other messages.

It is another object of the present invention to provide methods and systems that can reduce the time to set up a group call.

It is still another object of the present invention to provide methods and systems that can increase the probability that a group call origination message is correctly received at a radio base station.

These and other objects can be provided according to the present invention by receiving a login message at a radio base station from a mobile terminal wherein the login message includes a caller address number for the mobile terminal and wherein the caller address number comprises a first number of bits. After receiving the login message, a temporary identification number is selected at the radio base station for the mobile terminal wherein the temporary identification number comprises a second number of bits less than the first number of bits, and the temporary identification number is transmitted from the radio base station to the mobile terminal. After transmitting the temporary identification number, a digital information message is received at the radio base station from the mobile terminal wherein the digital information message includes the temporary identification number and payload information. By assigning a relatively short temporary identification number to the mobile terminal, subsequent messages from the mobile terminal to the radio base station can include more payload information.

In addition, the caller address number can be saved at the radio base station. Accordingly, the temporary identification number in the digital information message can be used to determine at the radio base station the caller address number for the mobile terminal. The radio base station can thus send the caller address number and the payload information to the switching center. Accordingly, the use of the temporary identification number can be made transparent to the switching center so that radio base stations according to the present invention can be used with conventional switching centers produced by other manufacturers.

By using the relatively short temporary identification number, messages such as group call origination messages can be sent and received over a single time slot of a time division multiple access (TDMA) radio channel of a communications standard such as the IS-136 communications standard. The time to send these messages can thus be reduced, and the probability of receiving these messages without corruption can be increased. More particularly, the digital information message can include a caller address field and a payload field, wherein the temporary identification number is received in a first portion of the caller address field, and wherein a first portion of the payload information is received in the payload field and a second portion of the payload information is received in a second portion of the caller address field. According to the IS-136 communications.standard, for example, the caller address field of a conventional message includes a 34 bit mobile identification number. According to the present invention, the use of a shorter temporary identification number allows additional payload information to be sent in a portion of the caller address field of the message.

In particular, the digital information message can be an origination message for a group call and the payload information can include a group number identifying a group of mobile terminals to be included in the group call. Because the origination message for the group call can be transmitted as a single slot message over a single slot of a single TDMA time frame of a digital control channel (DCCH), the group call can be established more quickly and more reliably. This is particularly useful for group dispatch communications used by emergency service providers such as police and fire departments where rapid call setup is important. In these types of applications, group dispatch communications may include many short calls with each call requiring the transmission of a group call origination message over a digital control channel. By providing each group call origination message over a single time slot of a single DCCH time frame, loading of the DCCH capacity can also be reduced.

The present invention can also include receiving a second login message from the mobile terminal at a second radio base station of the communications system wherein the second login message includes the caller address number for the mobile terminal. After receiving the second login message, a second temporary identification number is selected at the second radio base station for the mobile terminal wherein the second temporary identification number comprises a third number of bits less than the first number of bits. The second temporary identification number is transmitted from the radio base station to the mobile terminal. After transmitting the second temporary identification number, a second digital information message is received at the second radio base station from the mobile terminal wherein the second digital information message includes the second temporary identification number.

According to the present invention, more payload information can be included in a single slot message transmitted over a single time slot of a single time division multiple access time frame. A group call origination message transmitted as a single slot message according to the present invention can thus speed the setup of a group call.

BRIEF DESCRIPTION OF THE DRAWINGS

FIG. 10 illustrates a message format for a one-to-one cellular communications message format for a cellular communications system according to FIG. 6.

FIG. 11 illustrates a manufacturer specific message format for a cellular communications message system according to FIG. 6.

FIG. 12 illustrates a message format for an origination message for a cellular communication system according to FIG. 6.

DETAILED DESCRIPTION

Figure 1:
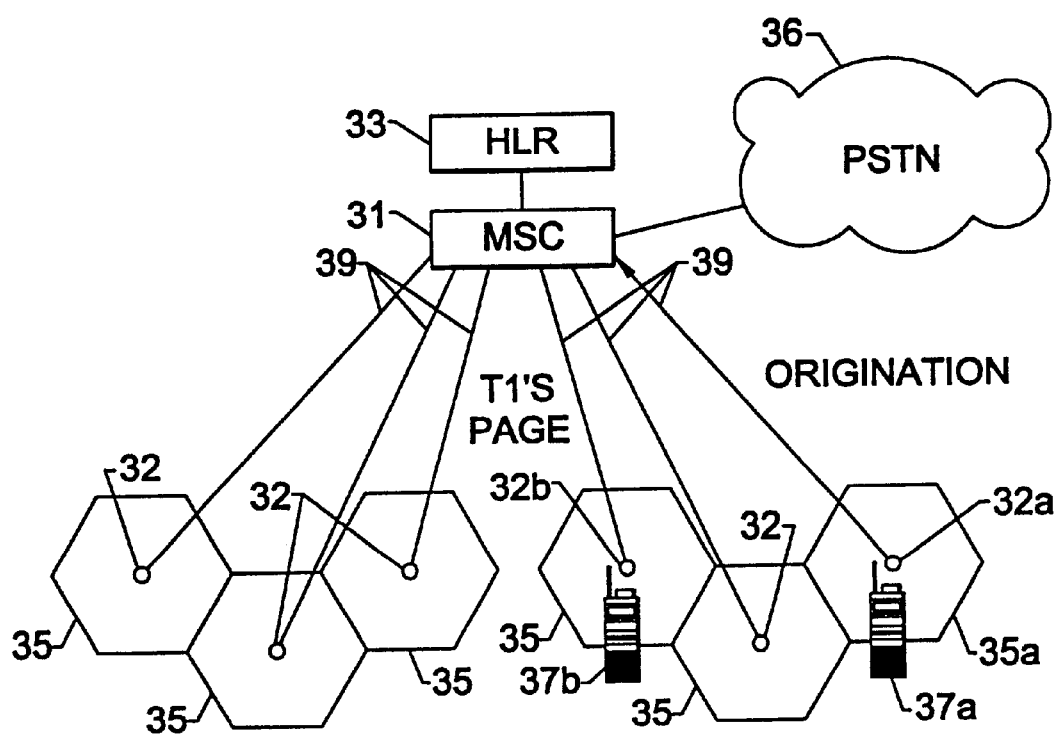
FIG. 1 is a block diagram of a cellular radiotelephone communications system according to the prior art.
Figure 2:
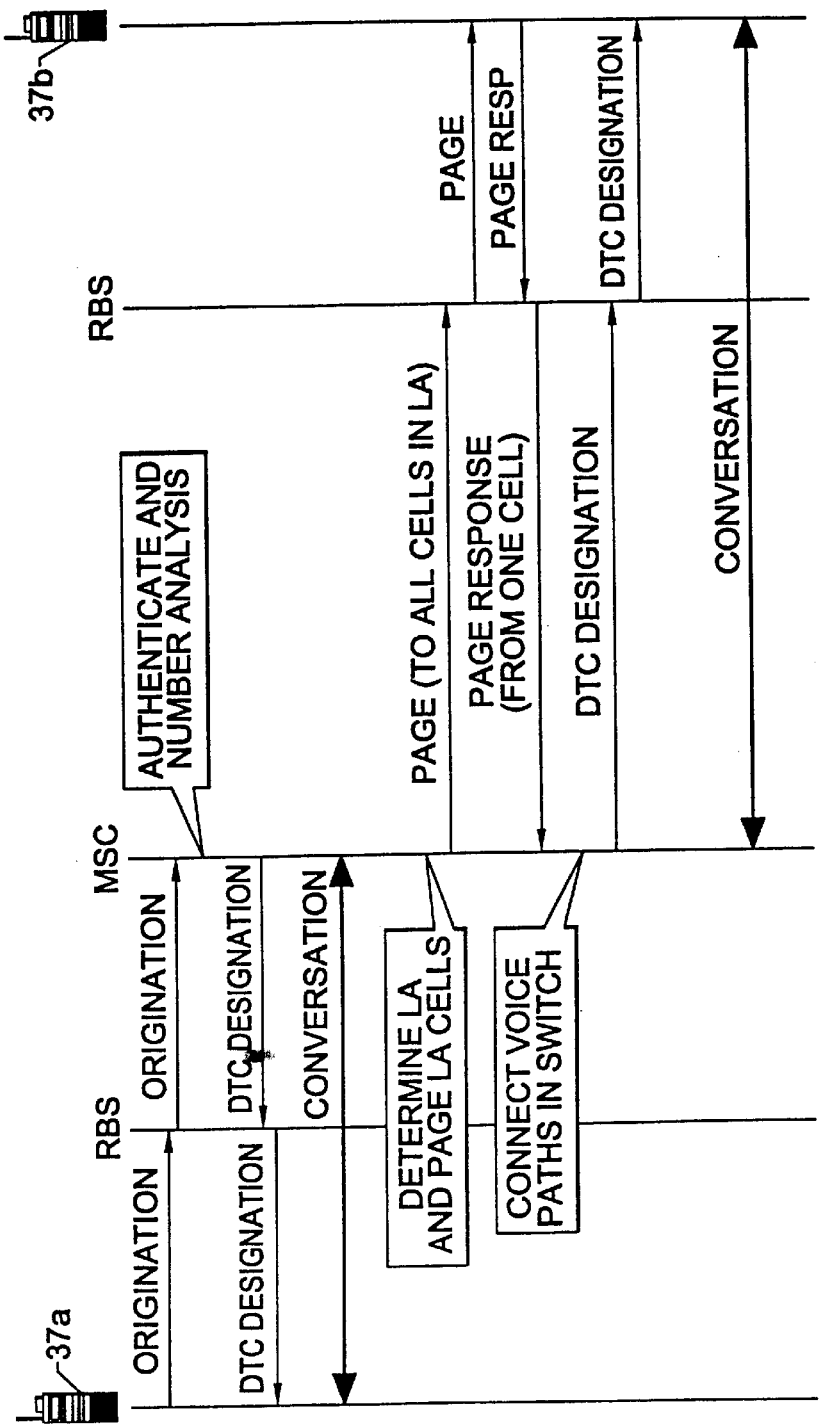
FIG. 2 is a message flow diagram illustrating steps of setting up a one-to-one radiotelephone call in the system of FIG. 1.
Figure 3:
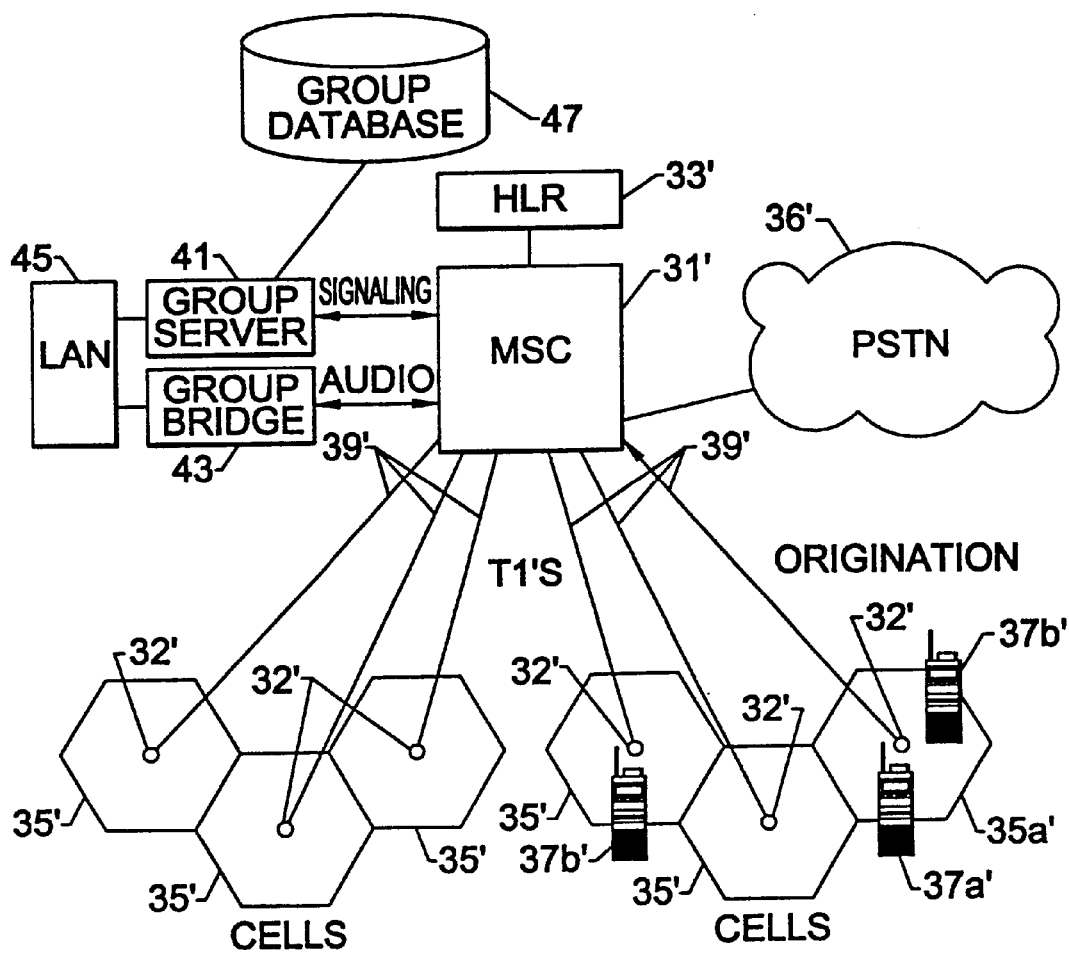
FIG. 3 is a block diagram of a cellular radiotelephone communications system with the addition of group calling functionality according to the prior art.
Figure 4:
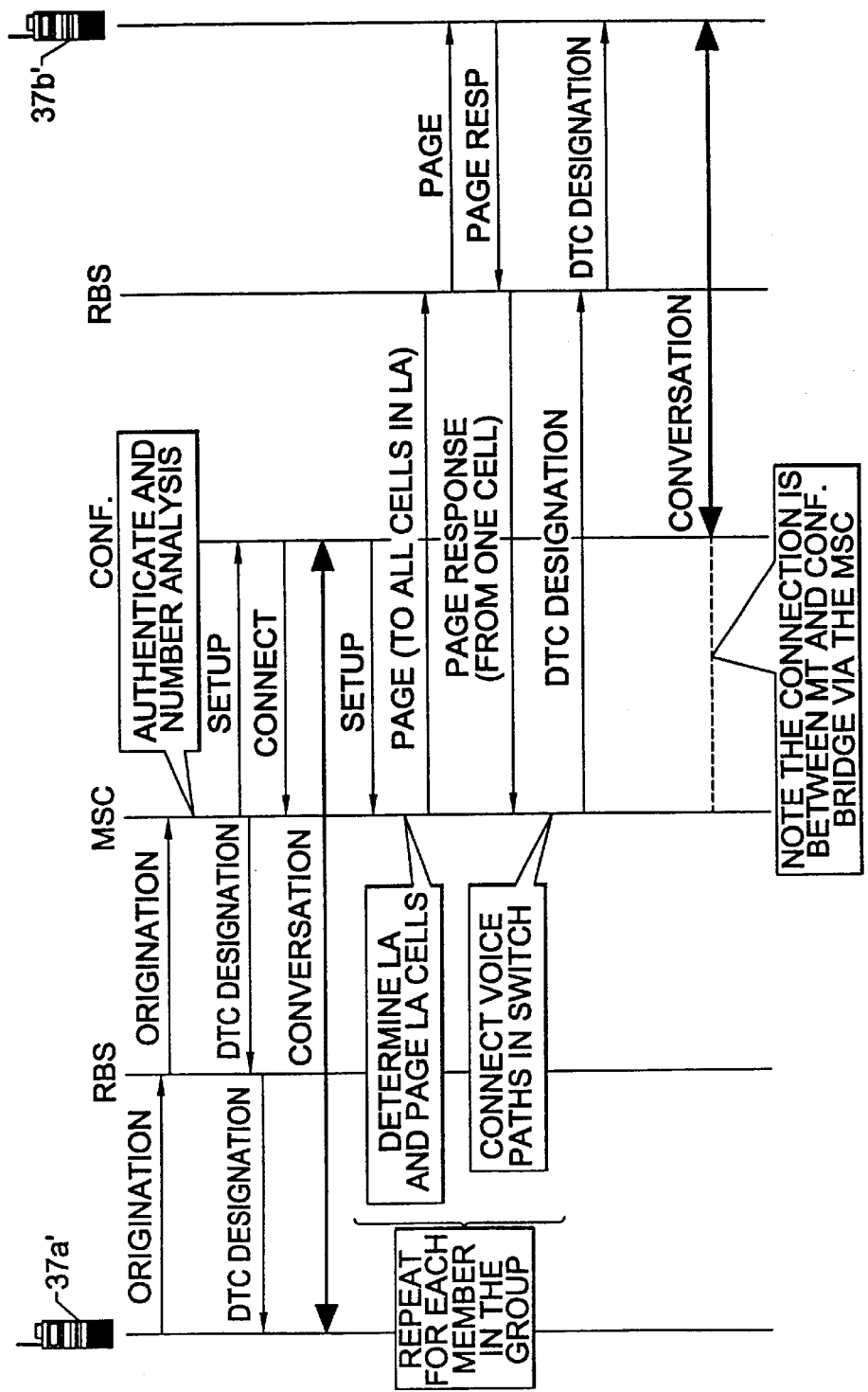
FIG. 4 is a message flow diagram illustrating steps of setting up a group radiotelephone call in the system of FIG. 3.
Figure 5:
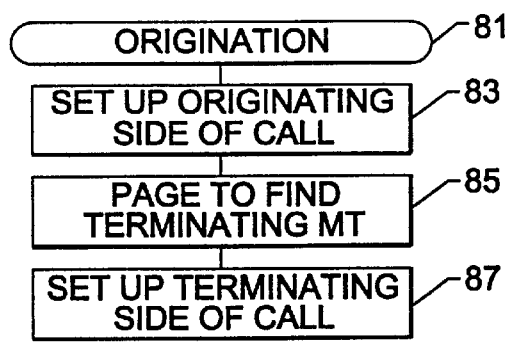
FIG. 5 is a flow diagram illustrating steps of setting up a group call according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A hybrid cellular radiotelephone communications system providing group communications according to the present invention will now be described with reference to FIGS. 6–8. In particular, the system of FIG. 6 includes a mobile switching center 131, a plurality of radio base stations defining a respective plurality of cells 132, and a home location register 133. Moreover, the mobile switching center 131 can be coupled to a public switched telephone network 136. The system of FIG. 6 can thus provide conventional one-to-one cellular radiotelephone communications according to a cellular communications standard such as the IS-136 standard.

In addition, group call functionality is provided using the group server 141, the group bridge 143, the router 153, the group database 147, the tracking database 149, and the mobile terminal parameter database 151. As shown, the mobile switching center 131 is coupled to the radio base stations 132 through communications links illustrated as solid lines. The communications links between the mobile switching center and the radio base stations (illustrated in solid lines) can be T1 links provided, for example, via landline or microwave.

Communication links are also provided between the router 153 and the radio base stations 132 as indicated by the dotted lines. In particular, the communications links between the router 153 and the radio base stations 132 can also be provided by T1 lines. As shown, the communications links between the router and the radio base stations can be provided through the mobile switching center using T1 lines, without processing these communications at the mobile switching center. This arrangement has the advantage that existing communications links (such as T1 lines) can be used thereby reducing the need for additional hardware. Alternately, communications links can be provided between the router and the radio base stations without physically passing through the mobile switching center. The communications links between the router and the radio base stations can be provided according to an existing standard such as the TCP/IP standard.

The tracking database 149 and the mobile terminal parameters database 151 are used to keep track of mobile terminal locations and parameters. In particular, each mobile terminal preferably generates a login message (transmitted over a digital control channel) whenever the mobile terminal enters a new cell and is thus serviced by a new base station or whenever the mobile terminal is turned on. The login message is received by the new servicing radio base station which then transmits the login message to the group server. The group server can thus determine which radio base station is currently serving each mobile terminal, and this information can thus be stored in the tracking database. The tracking database can thus be used to identify for each active mobile terminal the particular radio base station providing service to that mobile terminal.

Figure 7:
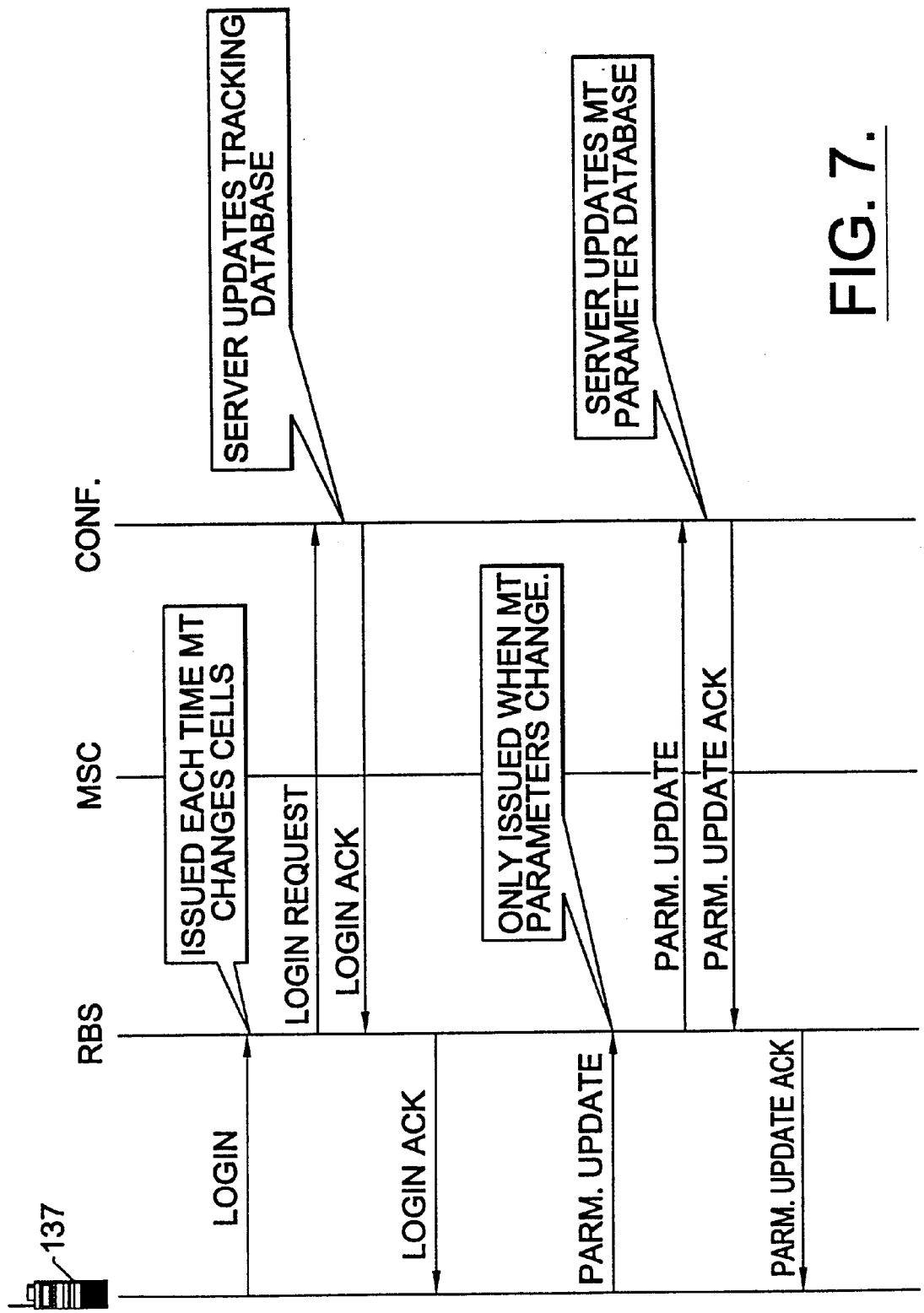
FIG. 7 is a message flow diagram illustrating steps of cell login-in according to the system of FIG. 5.

As also shown in FIG. 7, a parameter update message can be generated by the mobile terminal when the mobile terminal first enters the communications system or when parameters for the mobile terminal change. In particular, the parameter update message can include parameter information for the mobile terminal that may be different for other mobile terminals operating in the same system. For example, the parameter information can include the particular vocoder used by the terminal, and/or security information such as whether the mobile terminal supports encription and if so the type of encription. The parameter update message is received by the radio base station and the corresponding parameter information for the mobile terminal is stored in the mobile terminal database of the conference equipment. This information can then be used when issuing a called origination message as discussed below.

The login message can be a relatively short message transmitted within a single time slot of a single time division multiple access (TDMA) time frame so that traffic on the digital control channels is not significantly increased. The mobile terminal parameter database can be used to store mobile terminal parameters for each mobile terminal, and the mobile terminal parameters can be updated responsive to parameter update messages transmitted by the mobile terminals as discussed in greater detail below. The generation of login messages and parameter update messages is illustrated in FIG. 7. As also shown in FIG. 7, the radio base station (RBS) can also send a login acknowledge message including a temporary logical identification (TLID) number as will be discussed in greater detail below.

Figure 6:
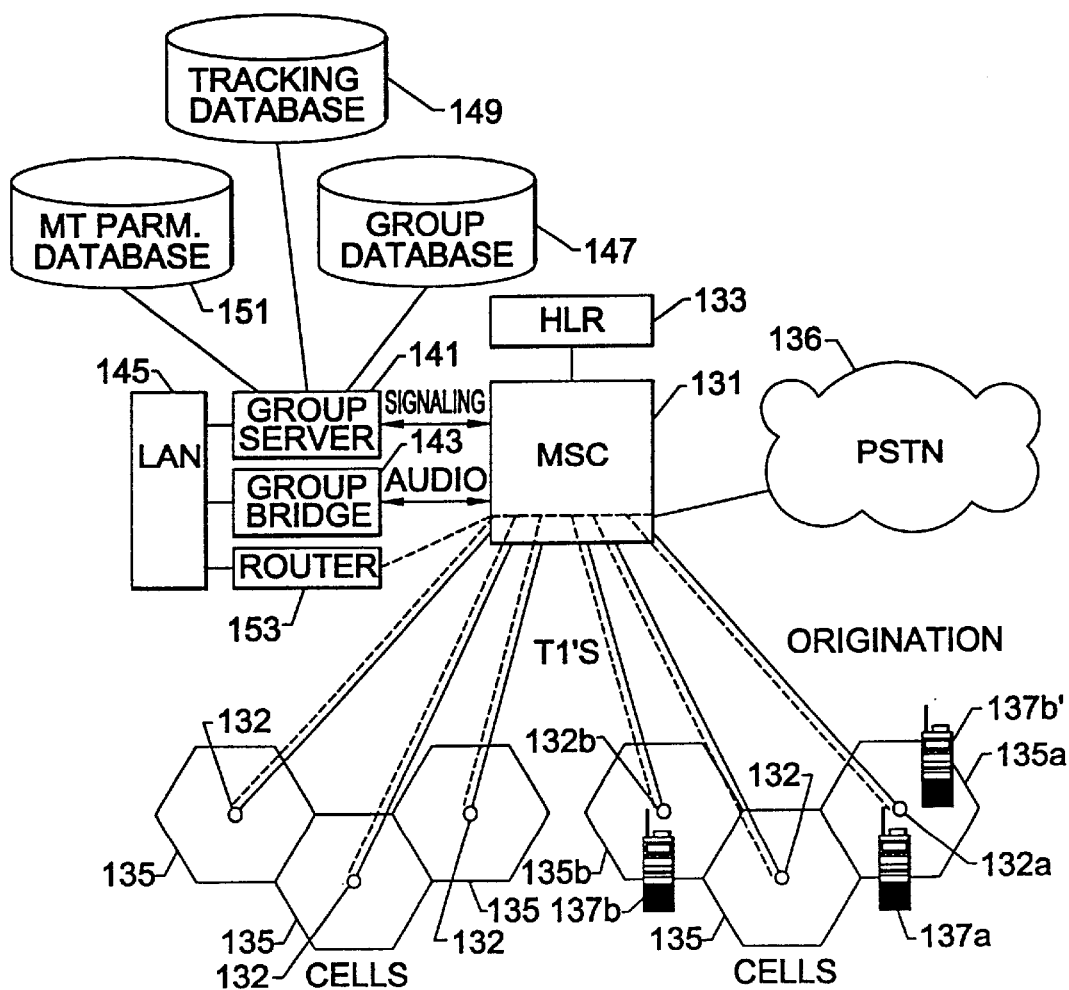
FIG. 6 is a block diagram of a cellular radiotelephone communications system including group calling functionality according to the present invention.
Figure 8:
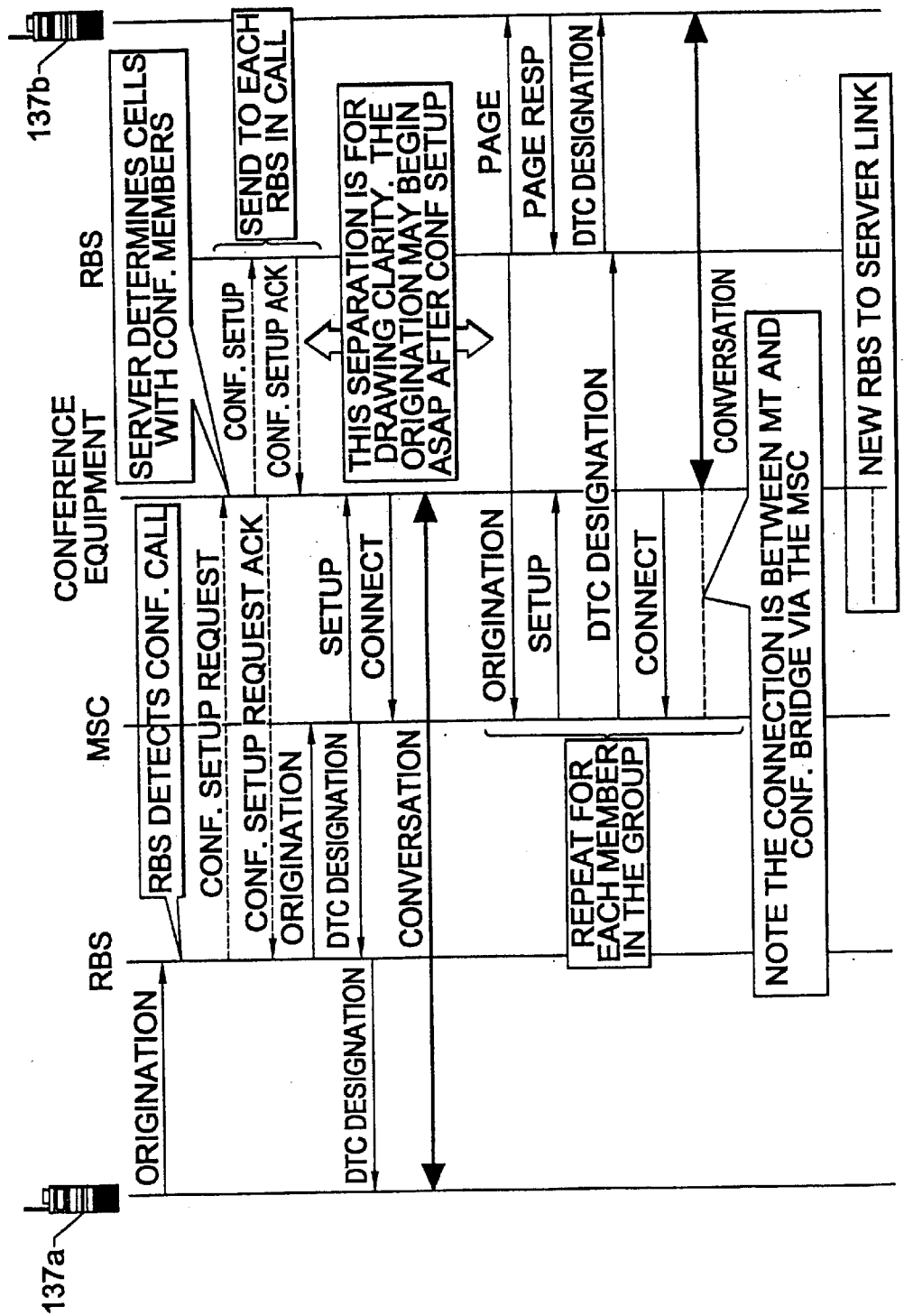
FIG. 8 is a message flow diagram illustrating steps of setting up a group radiotelephone call in the system of FIG. 5.

The setup of a group call using the system of FIG. 6 according to the present invention is illustrated in FIG. 8. In FIG. 8, the Conference Equipment includes the group server 141, group bridge 143, router 153, local area network 145, mobile terminal parameter database 151, tracking database 149, and group database 147. In particular, the originating mobile terminal 137a transmits a group call origination message that is received by the radio base station providing service to the originating mobile terminal (now referred to as the originating radio base station 132a). The information transmitted in the calling origination message can be reduced as compared to that of a conventional cellular origination message, because the parameter information for the mobile terminal is stored in mobile terminal parameter database as discussed above. By reducing the information transmitted in the calling origination message, the calling origination message can be transmitted over a single time slot thereby reducing call setup time.

The originating radio base station is able to identify a group call origination message, and thus transmits a group setup request to the group server 141. The group call origination message and the group setup request include portions thereof identifying the originating mobile terminal 137a and the group of mobile terminals (identified by a group number) to be included in the group call. In addition, the mobile identification numbers (MINs) for each mobile terminal in the group are stored in the group database 147. The group server is thus able to identify all mobile terminals to be included in the group call (now referred to as the called mobile terminals 137b).

The server verifies that the requested group is a valid group and that the originating mobile terminal 137a is allowed to initiate calls to the requested group. After successful verification, the server 141 references the group database 147 to determine the other mobile terminals in the called group (now referred to as the called mobile terminals 137b) and their mobile identification numbers (MINs). The server also checks the tracking database to determine the radio base stations currently serving the called mobile terminals (now referred to as the called radio base stations 132b).

As shown in FIG. 6, the called mobile terminal 137b is located in the called cell 135b serviced by the called radio base station 132b. The called mobile terminal 137b', however, is in the cell 135a, serviced by the radio base station 132a. Accordingly, the radio base station 132a is both the originating radio base station and one of the called radio base stations. The radio base station 132a can thus provide all the functions discussed with reference to the originating radio base station 132a as well as the functions discussed with reference to the called radio base stations 132b. Furthermore, more than three mobile terminals can be included in the calling group, and one or more of the mobile terminals of the group can be in any of the cells of the system.

The server then issues a group setup message to the called radio base stations 132b (and 132a in this example) as well as a conference acknowledge to the originating radio base station 132a. The server 141 also notifies the group bridge 143 which call-in numbers will be used for the group call so that the bridge 143 can group the calls together. A group setup message is thus sent to respective called radio base stations providing service for each active called mobile terminal in the called group. Moreover, each group setup message can include the following information: (1) the mobile identification number for the called mobile terminal; (2) the call-in number to be called by the called radio base station providing service for the called mobile terminal; (3) the group number called by the originating mobile terminal; and (4) the mobile terminal parameter data for the called mobile terminal.

Each of the called radio base stations then issues a called origination message to the mobile switching center 131 responsive to the group setup message. Each called origination message includes the mobile identification number (MIN) for the respective called mobile terminal so that the mobile switching center believes the respective called mobile terminal issued the called origination message. The called origination message also includes the call-in number in the called party field, as well as the parameter information previously stored in the mobile terminal parameter database. This allows the call setups for both the originating mobile terminals and the called mobile terminals to proceed in parallel. This procedure also allows the mobile switching center to use its standard authentication and billing functions. In other words, each mobile terminal in the called group is treated as if it originated a call, and each mobile terminal in the called group can be billed for its own air time. In other words, by using the information for the called mobile terminal stored in the tracking database and the mobile terminal parameter database, the called radio base station is able to issue the called origination message without waiting for the called mobile terminal to respond to a page thus reducing call setup time.

After issuing a called origination message, each called radio base station transmits a page during the next available paging subchannel to the respective called mobile terminal using the mobile identification number specified in the respective group setup message. This page wakes the mobile terminal to participate in the group call. The page message includes the group number in the calling party number field thus allowing the called mobile terminal to determine that the call is a group call so that the called mobile terminal can behave as if it originated a call once a digital traffic channel is assigned. Accordingly, the paging can proceed simultaneously with other call setup activities such as the designation of a digital traffic channel by the mobile switching center.

Because the radio base station servicing each called mobile terminal is known as a result of the login message information stored in the tracking database, group setup messages can be transmitted only to radio base stations currently providing service to active mobile terminals in the group. Accordingly, the called radio base stations can transmit the respective called origination messages before receiving a page response from the respective called mobile terminal (or even before sending the page to the called mobile terminal). In other words, a called radio base station can begin setting up communications between it and the group bridge before the respective called mobile terminal has responded because it is already known that the called mobile terminal is being serviced by that base station, and because the group setup message for a called mobile terminal is only sent to the radio base station providing service therefor. The time required for group call setup can thus be reduced.

In addition, the originating radio base station receives a group setup request acknowledge to confirm that the group setup request was received by the group server. The group setup request acknowledge can include the mobile identification number for the originating mobile terminal, the call-in number (optional for the originating radio base station), the group number called by the originating mobile terminal, and mobile terminal parameter data (optional). The originating mobile terminal modifies the group call origination message received from the originating mobile terminal to include mobile terminal parameters received and replaces the called party number with the group call-in number if provided. The designation of a digital traffic channel and opening of a conversation path for the originating mobile terminal can thus be done in parallel with the designation of digital traffic channels and the opening of conversation paths for the called mobile terminals so that the time required for group call setup can be reduced. Furthermore, the group call functionality according to the present invention can be provided using cellular systems operating according to existing cellular standards such as IS-136.

Figure 9:
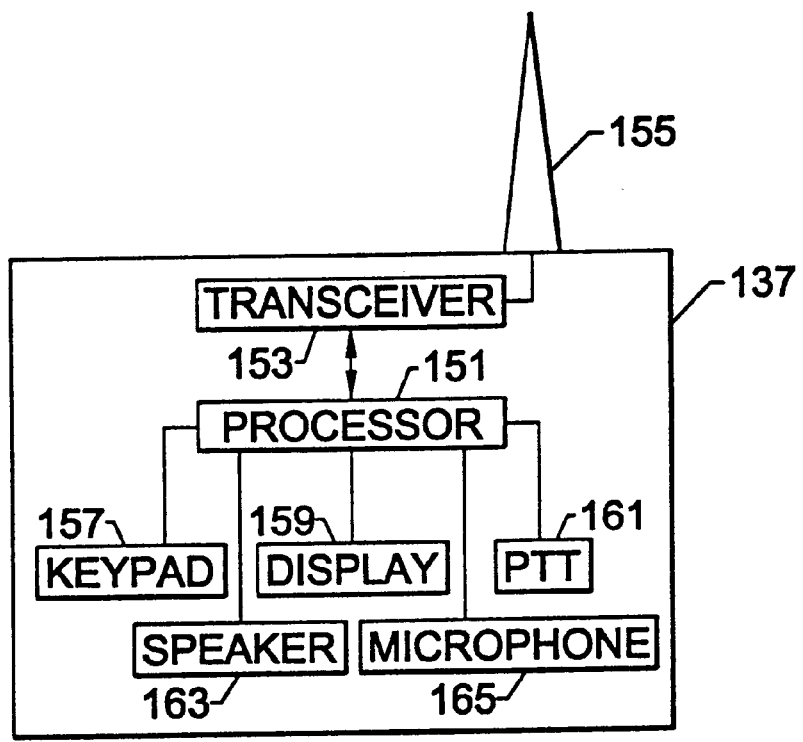
FIG. 9 is a block diagram of a mobile terminal for use with the cellular radiotelephone communications system of FIG. 6.

FIG. 9 is a block diagram of a mobile terminal 137 for use in the communications system of FIG. 6 providing both one-to-one cellular radiotelephone calls and group calls. As shown, the mobile terminal 137 includes a processor 151, a transceiver 153, an antenna 155, a keypad 157, a display 159, a push-to-talk (PTT) button 161, a speaker 163, and a microphone 165. The mobile terminal 137 can initiate and receive one-to-one cellular radiotelephone calls according to a conventional cellular standard such as the IS-136 standard. In particular, the mobile terminal can initiate a one-to-one call responsive to the entry of a telephone number through the keypad followed by pushing a send key on the keypad. The mobile terminal can receive a one-to-one call from other terminals upon receipt of a page from the communications system causing the phone to ring wherein the user can accept the call by pressing the send key on the keypad.

The processor of the mobile terminal 137 can also be programmed to provide the group calling features discussed above with regard to the communications system of FIG. 6, 7, and 8. In particular, the mobile terminal processor 151 can be programmed as one of a group of mobile terminals that can be included in group calls. For example, the mobile terminal processor (and the processors of other mobile terminals in the group) can be programmed with a group number identifying the group, and a group call can be initiated responsive to pressing the PTT button. When the PTT button is pushed, the mobile terminal transmits a calling origination message including the group number as discussed above thereby initiating a group call between the active mobile terminals in the group. The mobile terminal can also receive group calls as discussed above with reference to FIGS. 6–8. Moreover, the mobile terminal can transmit login messages and parameter messages as discussed with regard to FIG. 7.

The time needed to set up a group call can be further reduced by sending the group call origination message as a single slot message (SSM) in a single time slot of a single time division multiple access (TDMA) time frame of the IS-136 standard. More particularly, a group origination message can be sent in a single time slot by assigning a temporary logical identification (TLID) number to the mobile terminal during the login procedure discussed above with regard to 7, and using this temporary logical identification number to identify the mobile terminal in the group call origination message. By using a temporary logical identification number with fewer bits than the mobile identification number (MIN), a portion of the caller identification field of an IS-136 message can be used to transmit additional payload information. For example, the caller identification field may comprise 34 bits for the transmission of a 34 bit mobile identification number (MIN), but a temporary logical identification number of, for example, 8 to 10 bits can be used for the group call origination message leaving approximately 24 to 26 additional bits of the caller identification field for additional payload information.

In particular, a mobile terminal 137 adapted for group communications is shown in FIG. 9, and the mobile terminal processor 151 can include nonvolatile, read-only memory that stores a unique mobile identification number (MIN) for the mobile terminal. According to the IS-136 standard, the mobile identification number can be a 34 bit number. The processor can also includes programmable memory that can be used to store a temporary logical identification (TLID) number received from a base station of a communication system according to the present invention.

Figure 14:
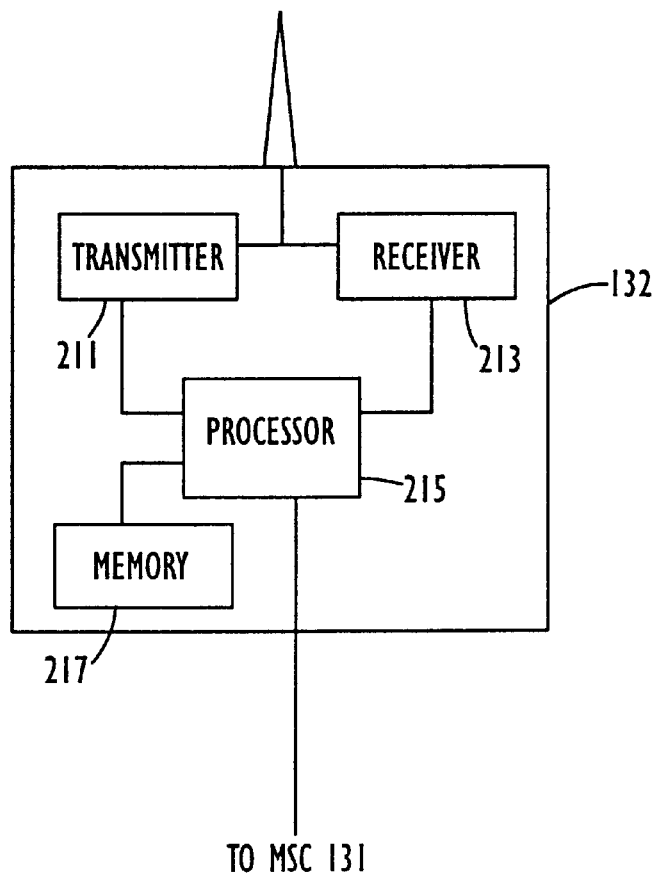
FIG. 14 is a block diagram of a radio base station for a cellular communications system according to FIG. 6.

As shown in FIGS. 7, 9, and 14, the mobile terminal 137 programmed for group communications can transmit a login message to the servicing radio base station (RBS) 132 each time the mobile terminal enters a new cell 135. As discussed above, the login message includes the mobile identification number (MIN) uniquely identifying the mobile terminal 137, and the communications system can use this login message to more quickly locate the mobile terminal 137 for paging. The subsequent login acknowledge message is transmitted by transmitter 211 of the radio base station 132, and this login acknowledge message can also be used to transmit the temporary logical identification (TLID) number to the mobile terminal 137 for use by the mobile terminal when in that cell. The TLID is then received by the mobile terminal transceiver 153 and saved in programmable processor memory.

In particular, the temporary logical identification number is preferably generated by the radio base station 132 processor 215 as opposed to the mobile switching center 131. Accordingly, the use of the temporary logical identification number can be made transparent to the mobile switching center 131. Each radio base station 132 in a system thus only needs a set of temporary logical identification numbers sufficient to assign a different temporary logical identification number to each mobile terminal programmed for group communication in the corresponding cell during peak usage. For example, an 8 to 10 bit temporary logical identification number may be sufficient thereby freeing approximately 24 to 26 bits of the caller identification field of a group call origination message sent by the mobile terminal for additional payload information.

The additional payload bits allow the group call origination message to be transmitted by the mobile terminal 137a of FIGS. 6 and 8 as a single slot message over a single time slot of a single TDMA time frame thereby speeding set up of the group call. The probability that the origination message is correctly received by the base station after the first transmission can also be increased thereby increasing system robustness. In contrast, origination messages transmitted over time slots of multiple TDMA time frames may require the correct transmission and reception over the plurality of time slots thus further slowing call origination if a retransmission of the origination message is needed.

Single slot message (SSM) formats for one-to-one communications messages for messages transmitted over a single time slot of a single time frame according to the IS-136 standard are shown in FIGS. 10 and 11 for. comparison with a single slot message (SSM) format for a group communications single slot message according to the present invention. Single slot messages defined by the IS-136 standard for one-to-one cellular communications can include a protocol discriminator, a message type identifier, a first information element, and a second information element as shown in FIG. 10. Messages sent by mobile terminals using this format include a 34 bit caller identification field used to transmit the 34 bit mobile identification number uniquely identifying the mobile terminal. The message format illustrated in FIG. 10 can be used for message types common to all communications systems operating according to the IS-136 standard.

Manufacturer specific message types can also be provided using the format shown in FIG. 11. As shown, a manufacturer specific message type can include a protocol discriminator, a message type identifier (in this case identifying a manufacturer specific message type), a base station manufacturer code (BSMC), a BSMC message type, a first information element, and a second information element. Accordingly, different manufactures can use this message format to provide unique functionality for the base station manufactured thereby. When this manufacturer specific message format is used to transmit a message over a single time slot, however, 11 bits may be needed to identify the base station manufacturer code and the BSMC message type thereby reducing the number of bits remaining to transmit information elements.

A manufacturer specific message format used to transmit a group call origination message during a single time slot according to the present invention is illustrated in FIG. 12. In particular, the message type indicates that the message is a BSMC message specific to a manufacturer, and the Base Station Manufacturer Code identifies the manufacturer (i.e., Ericsson). The BSMC Specific Message Type identifies the group call origination message, and the TLID enabled bit can be used to indicate that the sending mobile terminal is identified in the message by a temporary logical identification as opposed to a mobile identification number. Accordingly, a portion of the message conventionally used to transmit the mobile identification number can instead be used to transmit payload information as shown in FIG. 13.

Figure 13:
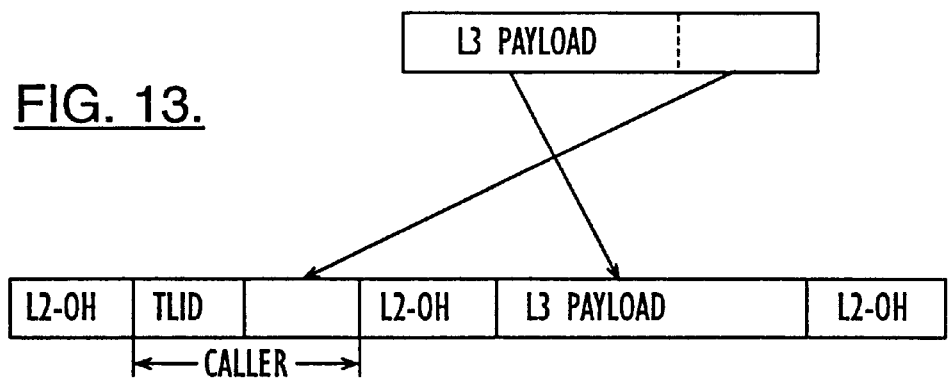
FIG. 13 illustrates a single time slot origination message for a cellular communications system according to FIG. 6.

As shown in FIG. 13, the single slot message (SSM) transmitted by a mobile terminal over a single time slot of a single TDMA time frame conventionally includes a caller identification field and a payload field with the caller identification field being used to transmit the mobile identification number. By substituting the temporary logical identification for the mobile identification number, a portion of the caller identification field can be used to transmit payload information. In other words, a first portion of the payload information can be transmitted in the SSM payload field, and a second portion of the payload information can be transmitted in the caller identification field. In particular, payload information can be defined to include level 3 (L3) payload according to the IS-136 standard. Level 3 payload, for example, can include all the information discussed above with reference to FIG. 12. The single slot message of FIG.

13 can also include level 2 overhead (L2-OH) according to the IS-136 standard.

A radio base station 132 as shown in FIG. 14 receiving a group call origination message through receiver 213 according to the format of FIGS. 12 and 13 has stored in base station memory 217 a table of mobile identification numbers associated with assigned temporary logical identification numbers based on previously received login messages. The base station processor 215 can thus identify the temporary logical identification number in the group call origination message and then identify the associated mobile identification number for the transmitting mobile terminal. The radio base station 132 can then send a corresponding message to the mobile switching center 131 including payload information and the mobile identification number so that the use of the message format of FIGS. 12 and 13 and the use of the temporary logical identification number is transparent to the mobile switching center 131. Accordingly, no change at the mobile switching center is needed to support use of the single slot messages of the present invention.

The radio base station 132 supporting temporary logical identification numbers according to the present invention can transmit a base station manufacturer code (BSMC) message over a broadcast control channel (BCCH) indicating that TLIDs are supported. Accordingly, mobile terminals may only issue TLID login messages and origination messages when being serviced by base stations supporting these operations. Moreover, TLID messages are preferably only transmitted from the mobile terminal to the radio base station so that mobile terminals not supporting TLID operations are not confused by TLID messages transmitted by the base station. In other words, all messages transmitted by the base station preferably identify the target mobile terminal using the full mobile identification number as opposed to a TLID.

The radio base stations and operations of the present invention are particularly useful for communications systems that support the IS-136 A interface between radio base stations and mobile switching centers. The IS-136 A interface allows base stations from different manufactures to work with any mobile switching center supporting the A interface. Accordingly, group calls according to the present invention can be provided with radio base stations of the present invention coupled to conventional mobile switching centers.

The single slot messages of the present invention can thus be used to provide group call origination messages thereby reducing the time need to establish a group call. Because the group call origination message can be transmitted over a single time slot, the time required to transmit the message can be reduced, and the probability that the message is received without corruption can be increased. Improved performance can thus be provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of receiving digital messages from a mobile terminal at a radio base station of a communications system including a plurality of radio base stations, the method comprising the steps of:

receiving a login message at the radio base station from the mobile terminal wherein the login message includes a caller address number for the mobile terminal and wherein the caller address number comprises a first number of bits;

after receiving the login message, selecting at the radio base station a temporary identification number for the mobile terminal wherein the temporary identification number comprises a second number of bits less than the first number of bits;

transmitting the temporary identification number from the radio base station to the mobile terminal; and after transmitting the temporary identification number, receiving at the radio base station a digital information message from the mobile terminal wherein the digital information message includes the temporary identification number and payload information.

2. A method according to claim 1 wherein the plurality of radio base stations are coupled through a switching center, the method further comprising the steps of:

saving the caller address number at the radio base station;

after receiving the digital information message at the radio base station, using the temporary identification number to determine the caller address number for the mobile terminal; and sending the caller address number and the payload information to the switching center.

3. A method according to claim 1 wherein the digital information message is received over a single time slot of a time division multiple access (TDMA) radio channel.

4. A method according to claim 1 wherein the digital information message is received over a single time slot of a time division multiple access (TDMA) radio channel of the IS-136 communications standard.

5. A method according to claim 4 wherein the digital information message comprises a caller address field and a payload field, wherein the temporary identification number is received in a first portion of the caller address field, and wherein a first portion of the payload information is received in the payload field and a second portion of the payload information is received in a second portion of the caller address field.

6. A method according to claim 5 wherein the caller address field comprises 34 bits.

7. A method according to claim 1 wherein the caller address number comprises a mobile identification number for the mobile terminal.

8. A method according to claim 7 wherein the first number of bits is 34 bits.

9. A method according to claim 1 wherein the digital information message comprises an origination message for a group call and wherein the payload information comprises a group number identifying a group of mobile terminals to be included in the group call.

10. A method according to claim 1 further comprising the steps of:

receiving a second login message from the mobile terminal at a second radio base station of the communications system wherein the second login message includes the caller address number for the mobile terminal;

after receiving the second login message, selecting at the second radio base station a second temporary identification number for the mobile terminal wherein the second temporary identification number comprises a third number of bits less than the first number of bits;

transmitting the second temporary identification number from the radio base station to the mobile terminal; and after transmitting the second temporary identification number, receiving a second digital information message at the second radio base station from the mobile terminal wherein the second digital information message includes the second temporary identification number.

11. A method of transmitting digital messages from a mobile terminal to a communications system including a plurality of radio base stations, the method comprising the steps of:

transmitting a login message from a mobile terminal to a radio base station wherein the login message includes a caller address number for the mobile terminal and wherein the caller address number comprises a first number of bits;

after transmitting the login message, receiving at the mobile terminal a temporary identification number from the radio base station wherein the temporary identification number comprises a second number of bits less than the first number of bits; and after receiving the temporary identification number, transmitting a digital information message from the mobile terminal to the radio base station wherein the digital information message includes the temporary identification number and payload information.

12. A method according to claim 11 wherein the digital information message is transmitted over a single time slot of a time division multiple access (TDMA) radio channel.

13. A method according to claim 11 wherein the digital information message is transmitted over a single time slot of a time division multiple access (TDMA) radio channel of the IS-136 communications standard.

14. A method according to claim 13 wherein the digital information message comprises a caller address field and a payload field, wherein the temporary logical identification number is sent in a first portion of the caller address field, and wherein a first portion of the payload information is sent in the payload field and a second portion of the payload information is sent in a second portion of the caller address field.

15. A method according to claim 14 wherein the caller address field comprises 34 bits.

16. A method according to claim 11 wherein the caller address number comprises a mobile identification number for the mobile terminal.

17. A method according to claim 16 wherein the first number of bits is 34 bits.

18. A method according to claim 11 wherein the digital information message comprises an origination message for a group call and wherein the payload information comprises a group number identifying a group of mobile terminals to be included in the group call.

19. A method according to claim 11 further comprising the steps of:

transmitting a second login message from the mobile terminal to a second radio base station of the communications system wherein the second login message includes the caller address number for the mobile terminal;

after transmitting the second login message, receiving at the mobile terminal a second temporary identification number from the second radio base station wherein the temporary identification number comprises a third number of bits less than the first number of bits; and after receiving the second temporary identification number, transmitting a second digital information message from the mobile terminal to the second radio base station wherein the second digital information message includes the second temporary identification number.

20. A radio base station of a communications system including a plurality of radio base stations wherein the radio base station receives digital messages from a mobile terminal, the radio base station comprising:

a receiver that receives a login message from the mobile terminal wherein the login message includes a caller address number for the mobile terminal and wherein the caller address number comprises a first number of bits;

a processor coupled to the receiver wherein the processor selects a temporary identification number for the mobile terminal wherein the temporary identification number comprises a second number of bits less than the first number of bits; and a transmitter coupled to the processor wherein the transmitter transmits the temporary identification number to the mobile terminal, and wherein the receiver receives a digital information message including the temporary identification number and payload information from the mobile terminal.

21. A radio base station according to claim 20 wherein the plurality of radio base stations are coupled through a switching center, wherein the processor saves the caller address number at the radio base station, wherein the processor uses the temporary identification number to determine the caller address number for the mobile terminal after receiving the digital information message, and wherein the processor sends the caller address number and the payload information to the switching center.

22. A radio base station according to claim 20 wherein the digital information message is received over a single time slot of a time division multiple access (TDMA) radio channel.

23. A radio base station according to claim 20 wherein the digital information message is received over a single time slot of a time division multiple access (TDMA) radio channel of the IS-136 communications standard.

24. A radio base station according to claim 23 wherein the digital information message comprises a caller address field and a payload field, wherein the temporary logical identification number is received in a first portion of the caller address field, and wherein a first portion of the payload information is received in the payload field and a second portion of the payload information is received in a second portion of the caller address field.

25. A radio base station according to claim 24 wherein the caller address field comprises 34 bits.

26. A radio base station according to claim 20 wherein the caller address number comprises a mobile identification number for the mobile terminal.

27. A radio base station according to claim 26 wherein the first number of bits is 34 bits.

28. A radio base station according to claim 20 wherein the digital information message comprises an origination message for a group call and wherein the payload information comprises a group number identifying a group of mobile terminals to be included in the group call.

29. A communication system that provides communications for a mobile terminal, the communications system comprising:

a first radio base station comprising,
a first receiver that receives a login message from the mobile terminal wherein the login message includes a caller address number for the mobile terminal and wherein the caller address number comprises a first number of bits, a first processor coupled to the first receiver wherein the first processor selects a first temporary identification number for the mobile terminal wherein the first temporary identification number comprises a second number of bits less than the first number of bits, and a first transmitter coupled to the first processor wherein the first transmitter transmits the first temporary identification number to the mobile terminal, and wherein the first receiver receives a first digital information message including the first temporary identification number and first payload information from the mobile terminal;

a second radio base station comprising, a second receiver that receives a second login message from the mobile terminal wherein the second login message includes the caller address number for the mobile terminal, a second processor coupled to the second receiver wherein the second processor selects a second temporary identification number for the mobile terminal wherein the second temporary identification number comprises a third number of bits less than the first number of bits, a second transmitter coupled to the second processor wherein the second transmitter transmits the second temporary identification number to the mobile terminal, and wherein the second receiver receives a second digital information message including the second temporary identification number second payload information from the mobile station; and a switching center coupled between the first and second radio base stations.

30. A communications system according to claim 29 wherein the first processor sends the first payload information and the caller address number to the switching center responsive to the first digital information message, and wherein the second processor sends the caller address number and the second payload information to the switching center responsive to the second digital information message.

31. A mobile terminal for transmitting digital messages to a communications system including a plurality of radio base stations, the mobile terminal comprising:

a processor that stores a caller address number comprising a first number of bits for the mobile terminal and wherein the processor generates a login message including the caller address number;

a transmitter coupled to the processor wherein the transmitter transmits the login message to a radio base station; and a receiver coupled to the processor wherein the receiver receives a temporary identification number from the radio base station after transmission of the login message wherein the temporary identification number comprises a second number of bits less than the first number of bits, wherein the processor generates a digital information message including the temporary identification number and payload information, and wherein the transmitter transmits the digital information message to the radio base station.

32. A mobile terminal according to claim 31 wherein the digital information message is transmitted over a single time slot of a time division multiple access (TDMA) radio channel.

33. A mobile terminal according to claim 31 wherein the digital information message is transmitted over a single time slot of a time division multiple access (TDMA) radio channel of the IS-136 communications standard.

34. A mobile terminal according to claim 33 wherein the digital information message comprises a caller address field and a payload field, wherein the temporary logical identification number is sent in a first portion of the caller address field, and wherein a first portion of the payload information is sent in the payload field and a second portion of the payload information is sent in a second portion of the caller address field.

35. A mobile terminal according to claim 34 wherein the caller address field comprises 34 bits.

36. A mobile terminal according to claim 31 wherein the caller address number comprises a mobile identification number for the mobile terminal.

37. A mobile terminal according to claim 36 wherein the first number of bits is 34 bits.

38. A mobile terminal according to claim 31 wherein the digital information message comprises an origination message for a group call and wherein the payload information comprises a group number identifying a group of mobile terminals to be included in the group call.

* * * * *